(12) United States Patent
Tao et al.

(10) Patent No.: US 9,340,212 B2
(45) Date of Patent: May 17, 2016

(54) SYSTEM AND METHOD FOR ESTIMATING ROAD GRADE BASED ON AN OUTPUT OF A LONGITUDINAL ACCELERATION SENSOR IN A VEHICLE

(71) Applicant: GM Global Technology Operations LLC, Detroit, MI (US)

(72) Inventors: Xuefeng Tim Tao, Northville, MI (US); Richard L. Tiberg, Milford, MI (US); Thomas M. Sherman, Pinckney, MI (US); David William Minner, Pinckney, MI (US); Hualin Tan, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 53 days.

(21) Appl. No.: 14/291,501

(22) Filed: May 30, 2014

(65) Prior Publication Data

US 2015/0274174 A1 Oct. 1, 2015

Related U.S. Application Data

(60) Provisional application No. 61/973,573, filed on Apr. 1, 2014.

(51) Int. Cl.
*G05D 1/00* (2006.01)
*B60W 40/076* (2012.01)
*B60W 40/107* (2012.01)

(52) U.S. Cl.
CPC ........... *B60W 40/076* (2013.01); *B60W 40/107* (2013.01)

(58) Field of Classification Search
CPC .......................... B60W 40/076; B60W 40/107
See application file for complete search history.

(56) References Cited

U.S. PATENT DOCUMENTS

| 5,337,257 | A | 8/1994 | White |
| 5,579,230 | A | 11/1996 | Lin et al. |
| 6,826,502 | B2 | 11/2004 | Savard |
| 6,980,900 | B2 * | 12/2005 | Grieser ................... B60T 8/172 303/121 |
| 7,643,960 | B2 | 1/2010 | Tan et al. |
| 2003/0125864 | A1 * | 7/2003 | Banno ................... B60K 28/169 701/84 |
| 2003/0163226 | A1 * | 8/2003 | Tan ......................... B60T 8/172 701/1 |
| 2007/0088477 | A1 | 4/2007 | Brewer et al. |
| 2007/0213899 | A1 * | 9/2007 | Watanabe ........... B60G 17/0164 701/37 |
| 2014/0067155 | A1 * | 3/2014 | Yu ........................... B60W 40/13 701/1 |
| 2015/0183434 | A1 * | 7/2015 | Adamey .................... B60T 7/12 701/70 |

* cited by examiner

*Primary Examiner* — Calvin Cheung

(57) ABSTRACT

A system according to the principles of the present disclosure includes a longitudinal acceleration estimation module, a vehicle longitudinal acceleration sensor, a road grade estimation module, and an actuator control module. The longitudinal acceleration estimation module estimates a longitudinal acceleration of a vehicle based on at least one of a transmission output speed and a wheel speed. The vehicle longitudinal acceleration sensor measures the longitudinal acceleration of the vehicle. The road grade estimation module estimates a grade of a road on which the vehicle is traveling based on the estimated longitudinal acceleration and the measured longitudinal acceleration. The actuator control module controls an actuator of the vehicle based on the estimated road grade.

18 Claims, 11 Drawing Sheets

SYSTEM AND METHOD FOR ESTIMATING ROAD GRADE BASED ON AN OUTPUT OF A LONGITUDINAL ACCELERATION SENSOR IN A VEHICLE

CROSS-REFERENCE TO RELATED APPLICATIONS

This application claims the benefit of U.S. Provisional Application No. 61/973,573, filed on Apr. 1, 2014. The disclosure of the above application is incorporated herein by reference in its entirety.

FIELD

The present disclosure relates to internal combustion engines, and more specifically, to systems and methods for estimating road grade based on an output of a longitudinal acceleration sensor in a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some powertrain control systems estimate the grade of a road on which a vehicle is traveling and control an engine and a transmission based on the estimated road grade. For example, under normal conditions, a powertrain control system may automatically stop the engine when the engine is idling and automatically restart the engine when a brake pedal is released or an accelerator pedal is applied. However, when the estimated road grade is greater than a predetermined grade, indicating that the vehicle is on a steep hill, the powertrain control system may refrain from automatically stopping the engine. In another example, the powertrain control system may adjust a transmission shift pattern based on the estimated road grade.

The road grade is typically estimated using a relationship such as $$\sin\alpha = \frac{F_g}{F_\alpha} = \frac{ma_g}{F_\alpha} \quad (1)$$

where $\alpha$ is the road grade, $F_g$ is the force acting on the vehicle due to gravity, $F_\alpha$ is the force acting on the vehicle due to the road grade, m is the mass of the vehicle, and $a_g$ is the acceleration of the vehicle due to gravity. The mass of the vehicle may be predetermined based on an assumed number of passengers and an assumed payload. The acceleration of the vehicle due to gravity may be a predetermined value (e.g., 9.8 meters per seconds squared).

The force acting on a vehicle due to the road grade is typically estimated using a relationship such as $$\Sigma F = F_{ENG} + F_{AD} + F_\alpha = ma_L \quad (2)$$

where $\Sigma F$ is a sum of the longitudinal forces acting on the vehicle, $F_{ENG}$ is the force acting on the vehicle due to the torque output of the engine, $F_{AD}$ is the aerodynamic force acting on the vehicle, $F_\alpha$ is the force acting on the vehicle due to the road grade, m is the mass of the vehicle, and $a_L$ is the longitudinal acceleration of the vehicle. The force acting on the vehicle due to the torque output of the engine may be estimated based on measured engine operating conditions. The aerodynamic force acting on the vehicle may be estimated based on an assumed wind force. The longitudinal acceleration of the vehicle may be determined based on a measured vehicle speed.

Powertrain control systems typically assume that a vehicle is moving when estimating the torque output of an engine in the vehicle based on engine operating conditions. In addition, the relationship typically used to estimate the force acting on a vehicle due to the road grade does not account for the force acting on the vehicle due to braking. Thus, if a vehicle is stopped or if a brake is applied, the powertrain control systems typically do not estimate the road grade due to potential inaccuracies in the estimated road grade. Further, even when the vehicle is moving and the brake is not applied, the estimated road grade may be inaccurate due to other assumptions made when estimating the road grade. These other assumptions may include the assumed number of passengers, the assumed payload, and//or the assumed wind force.

Inaccuracies in the estimated road grade may adversely affect the ability of a powertrain control system to control an engine and a transmission based on the estimated road grade. For example, the estimated road grade may falsely indicate that a vehicle is on a steep hill. Therefore, the powertrain control system may not automatically stop an engine when the engine is idling as desired, which may adversely affect fuel economy.

SUMMARY

A system according to the principles of the present disclosure includes a longitudinal acceleration estimation module, a vehicle longitudinal acceleration sensor, a road grade estimation module, and an actuator control module. The longitudinal acceleration estimation module estimates a longitudinal acceleration of a vehicle based on at least one of a transmission output speed and a wheel speed. The vehicle longitudinal acceleration sensor measures the longitudinal acceleration of the vehicle. The road grade estimation module estimates a grade of a road on which the vehicle is traveling based on the estimated longitudinal acceleration and the measured longitudinal acceleration. The actuator control module controls an actuator of the vehicle based on the estimated road grade.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure avoids inaccuracies in road grade due to the assumptions described above by estimating the road grade based on an input from a vehicle longitudinal acceleration sensor. Thus, the system and method may accurately estimate the road grade even when the vehicle is stopped or a brake is applied. In addition, the system and method further improves the accuracy of the estimated road grade by accounting for offsets in the output of the vehicle longitudinal acceleration sensor. The offsets may be due to the sensor mounting, a change in payload due to a different number of passengers and/or a trailer connection, and/or drift in the sensor output over the life of the vehicle.

Figure 1:
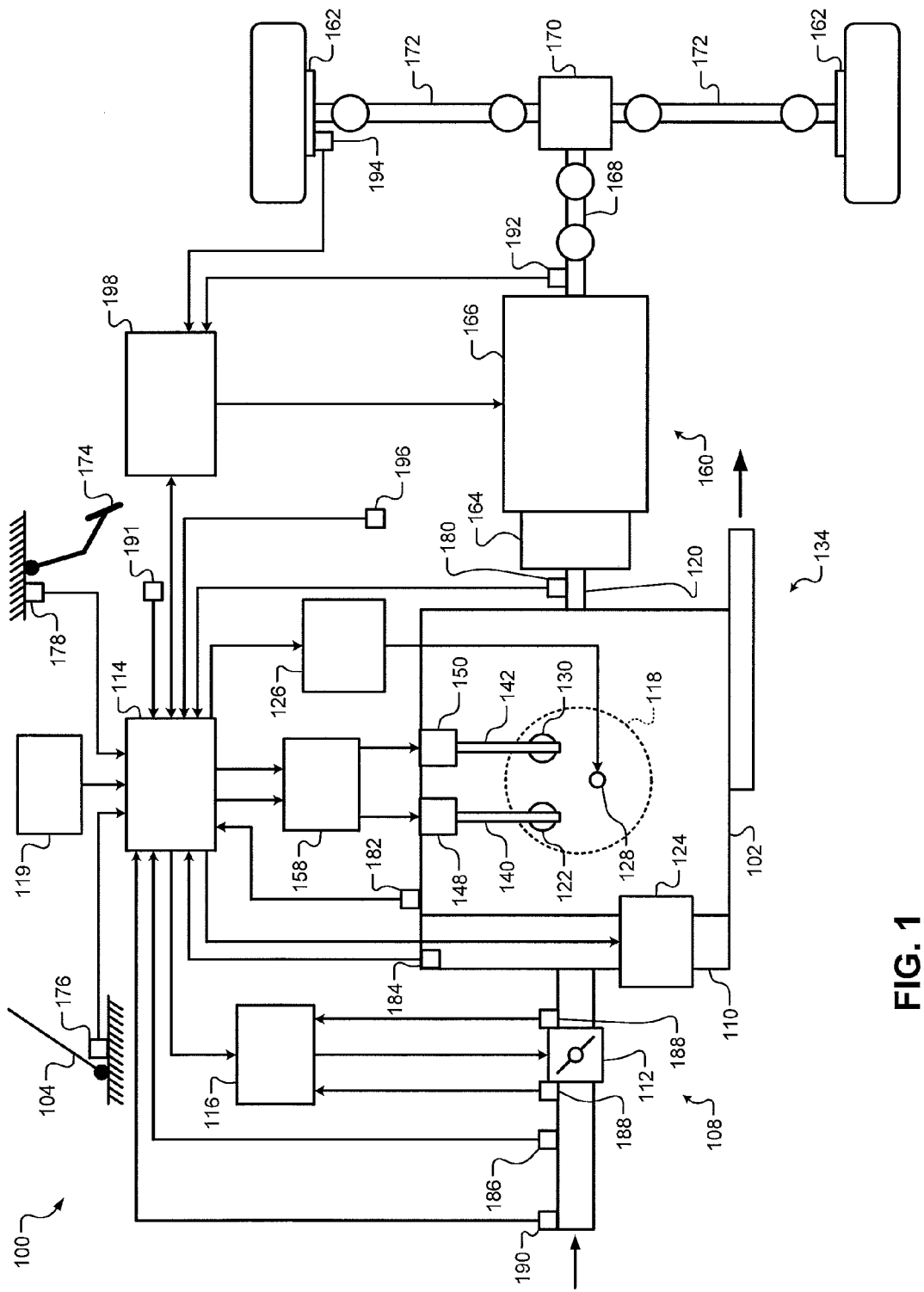
FIG. 1 is a functional block diagram of an example engine system according to the principles of the present disclosure.

Referring now to FIG. 1, an example implementation of a vehicle system 100 includes an engine 102 that combusts an air/fuel mixture to produce drive torque for a vehicle. The amount of drive torque produced by the engine 102 is based on the position of an accelerator pedal 104. The amount of drive torque produced by the engine 102 may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The ECM 114 may start and stop the engine 102 based on an input received from an ignition system 119. The ignition system 119 may include a key or a button. The ECM 114 may start the engine 102 when a driver turns the key from an off position to an on (or run) position or when the driver presses the button. The ECM 114 may stop the engine 102 when a driver turns the key from the on position to the off position or when the driver presses the button while the engine 102 is running.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. In the example implementation of the engine system 100 shown in FIG. 1, the drivetrain system 160 includes a torque converter 164, a transmission 166, a drive shaft 168, a differential 170, and axle shafts 172. In other implementations, the drivetrain system 160 may not include one or more of these components. The torque converter 164, the transmission 166, and the differential 170 amplify engine torque by several gear ratios to provide axle torque at the axle shafts 172. The axle torque rotates the wheels 162 and thereby accelerates the vehicle. The driver may decelerate the vehicle by applying a brake pedal 174.

The vehicle system 100 may measure the position of the accelerator pedal 104 using an accelerator pedal position (APP) sensor 176. The position of the brake pedal 174 may be measured using a brake pedal position (BPP) sensor 178. The position of the crankshaft 120 may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 188. The ambient temperature of air being drawn into the engine 102 may be measured using an intake air temperature (IAT) sensor 190. The ambient pressure of air may be measured using an intake air temperature (AAP) sensor 191. The output speed of the transmission 166 may be measured using a transmission output speed (TOS) sensor 192. The speed of the wheels 162 may be measured using a wheel speed sensor (WSS) 194.

The longitudinal acceleration of the vehicle may be measured using a vehicle longitudinal acceleration (VLA) sensor 196. The VLA sensor 196 may be mounted to a body and/or a frame of the vehicle. In various implementations, the VLA sensor 196 may also measure the lateral acceleration of the vehicle and the yaw rate of the vehicle. The ECM 114 may use signals from the sensors to make control decisions for the vehicle system 100.

Figure 2:
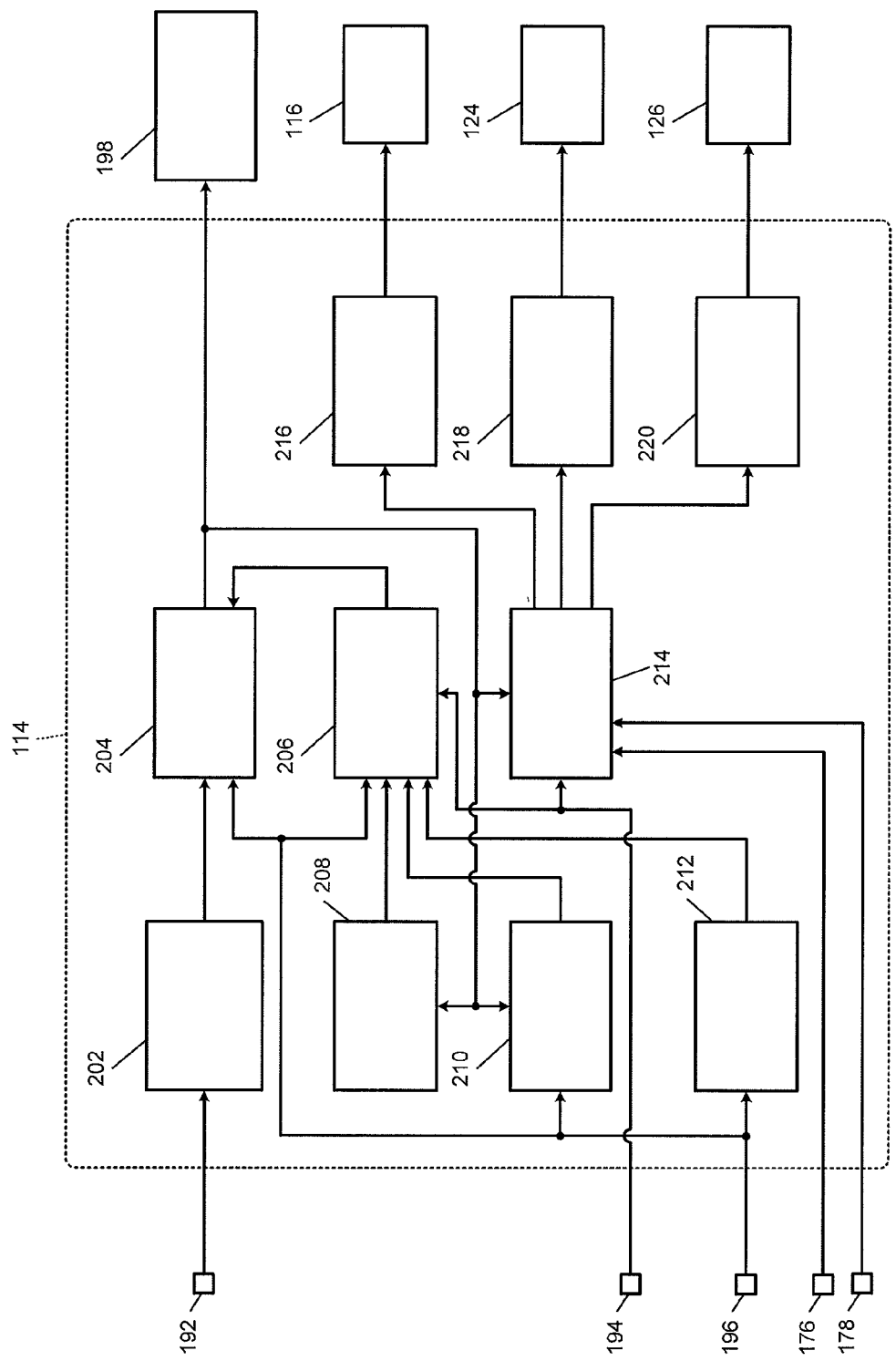
FIG. 2 is a functional block diagram of an example control system according to the principles of the present disclosure.

The ECM 114 may communicate with a transmission control module (TCM) 198 to coordinate shifting gears in the transmission 166. For example, the ECM 114 may reduce engine torque during a gear shift. Although some of the sensor signals are shown provided to the TCM 198, the TCM 198 may relay these sensor signals to the ECM 114. Alternatively, these sensor signals may be provided to the ECM 114 directly. In various implementations, various functions of the ECM 114 and the TCM 198 may be integrated into one or more modules. In addition, although FIG. 2 illustrates examples of modules that may be included in the ECM 114, one or more of these modules may be included in the TCM 198. Furthermore, the ECM 114, the TCM 198, and/or sensors that provide signals to the ECM 114 and/or the TCM 198 may be collectively referred to as a powertrain control system.

Referring now to FIG. 2, an example implementation of the ECM 114 includes a longitudinal acceleration estimation module 202. The longitudinal acceleration estimation module 202 estimates the longitudinal acceleration of the vehicle based on the transmission output speed from the TOS sensor 192. For example, the longitudinal acceleration estimation module 202 may determine the speed of the vehicle based on the transmission output speed and determine the derivative of the vehicle speed with respect to time to obtain the longitudinal acceleration. The longitudinal acceleration estimation module 202 may estimate the longitudinal acceleration based on the wheel speed from the WSS 194 in a similar manner.

A road grade estimation module 204 estimates the grade of the road on which the vehicle is traveling based on the estimated longitudinal acceleration and the longitudinal acceleration measured by the VLA sensor 196. For example, the road grade estimation module 204 may determine a longitudinal acceleration due to the road grade based on the estimated and measured longitudinal accelerations, and estimate the road grade based on the longitudinal acceleration due to the road grade. The road grade estimation module 204 may estimate the longitudinal acceleration due to the road grade using a relationship such as $$(a_L)_\alpha = (a_L)_{MEAS} - (a_L)_{EST} - (a_L)_{OFF} \qquad (3)$$

where $(a_L)_\alpha$ is the longitudinal acceleration due to the road grade, $(a_L)_{MEAS}$ is the measured longitudinal acceleration, $(a_L)_{EST}$ is the estimated longitudinal acceleration, and $(a_L)_{OFF}$ is a longitudinal acceleration due to an offset in the output of the VLA sensor 196.

The road grade estimation module 204 may estimate the road grade based on the longitudinal acceleration due to the road grade using a relationship such as $$\sin\alpha = \frac{F_g}{F_\alpha} = \frac{ma_g}{m(a_L)_\alpha} = \frac{a_g}{(a_L)_\alpha} \qquad (4)$$

where $\alpha$ is the road grade, $F_g$ is the force acting on the vehicle due to gravity, $F_\alpha$ is the force acting on the vehicle due to the road grade, m is the mass of the vehicle, and $a_g$ is the acceleration of the vehicle due to gravity, and $(a_L)_\alpha$ is the longitudinal acceleration due to the road grade. The mass of the vehicle and the acceleration of the vehicle due to gravity may be predetermined.

A sensor offset determination module 206 determines the offset in the output of the VLA sensor 196. The sensor offset determination module 206 may determine the sensor offset using a number of different methods that vary in duration. For example, some methods determine the sensor offset nearly instantaneously, while other methods determine the sensor offset over a short term (e.g., days or weeks). Still other methods determine the sensor offset over a mid-to-long term (e.g., 1 month to life of vehicle).

The sensor offset determination module 206 may use an instantaneous method to determine the sensor offset when the vehicle is first assembled. In this method, the vehicle is parked on a surface having a predetermined grade (e.g., 0%). A user then communicates with the ECM 114 using, for example, a user interface device (e.g., a touchscreen) in the vehicle or an external module (e.g., a scan tool), to provide the predetermined grade to the sensor offset determination module 206. The sensor offset determination module 206 determines the sensor offset based on an input from the VLA sensor 196 and the predetermined grade. For example, the sensor offset determination module 206 may estimate a longitudinal acceleration based on the predetermined grade and set the sensor offset equal to the difference between the measured and estimated longitudinal accelerations. The sensor offset determination module 206 may permanently store the sensor offset in non-volatile memory and adjust the sensor offset over the life of the vehicle based on sensor offsets determined using other methods.

The sensor offset determination module 206 may adjust the sensor offset by a percentage of a newly determined sensor offset that is based on the method used to determine the new sensor offset. For example, the sensor offset determination module 206 may adjust the sensor offset by a large percentage (e.g., 100 percent (%)) of a new sensor offset when the new sensor offset is determined using an instantaneous method. The sensor offset determination module 206 may adjust the sensor offset by a medium percentage (e.g., 30% to 40%) of a new sensor offset when the new sensor offset is determined using a short term method. The sensor offset determination module 206 may adjust the sensor offset by a small percentage (e.g., 0% to 10%) of a new sensor offset when the new sensor offset is determined using a mid-to-long term method.

The sensor offset determination module 206 may use another instantaneous method to determine the sensor offset at each ignition key off (e.g., each time that the ignition system 119 is switched from on to off). In this method, at each ignition key off, the sensor offset determination module 206 stores the last reading from the VLA sensor 196 before the ignition key off. Then, at the next ignition key on (e.g., the next time that the ignition system 119 is switched from off to on), the sensor offset determination module 206 receives a new reading from the VLA sensor 196. The sensor offset determination module 206 then determines the sensor offset based on the stored reading and the new reading. For example, the sensor offset determination module 206 may assume that the vehicle is at the same location for the ignition key off and the ignition key on, and set the sensor offset equal to the difference between the stored reading and the new reading.

Thus, if the pitch of the vehicle changes due to, for example, a change in the number of passengers or a trailer being attached to the vehicle during ignition key off, the sensor offset reflects the change in the vehicle pitch. A similar method may be used to determine the sensor offset when the vehicle pitch changes without switching off the ignition system 119. For example, the sensor offset determination module 206 may store the reading from the VLA sensor 196 after the transmission is shifted to park. The sensor offset determination module 206 may then determine the sensor offset based on differences between the stored reading and new readings from the VLA sensor 196 while the transmission is in park. In various implementations, the sensor offset determination module 206 may determine the sensor offset based on a difference between the stored reading and the last reading from the VLA sensor 196 before the transmission is shifted out of park.

In the method described above, the sensor offset determination module 206 may assume that the vehicle is at the same location for the ignition key off and the ignition key on. Thus, if the vehicle is towed or otherwise moved from one location to another without switching the ignition system 119 from off to on, the sensor offset determined using this method may be inaccurate. Therefore, the road grade estimation module 204 may compare the sensor offset determined using this method to one or more of the sensor offsets using other methods described herein. If the comparison indicates that the sensor offset is unrealistic, the road grade estimation module 204 may not adjust the previous sensor offset based on the newly determined sensor offset.

The sensor offset determination module 206 may use a short term method to determine the sensor offset over a relatively short trip (e.g., a 10 to 30 mile trip). In this method, a road grade summation module 208 determines a running sum of road grade estimates. Each road grade estimate may be an average value of road grade estimates made over a predetermined distance (e.g., 1 meter). The sensor offset determination module 206 then determines whether the sum of road grade estimates corresponds to a roundtrip. If the sum corresponds to a roundtrip, the sensor offset determination module 206 may adjust the sensor offset based on a difference between the sum and zero, and then reset the sum to zero. Otherwise, the sensor offset determination module 206 may reset the sum to zero without adjusting the sensor offset based on the running sum.

The sensor offset determination module 206 may determine whether the vehicle has made a roundtrip, such as a daily commute, based on an input from a global positioning system (GPS), a real world time clock, and/or an ambient temperature sensor. Ambient temperature may be used as a secondary indicator of time. The sensor offset determination module 206 may determine whether the vehicle has made a roundtrip based on periods when the ignition system 119 is off. For example, the sensor offset determination module 206 may determine that the vehicle is parked at home when the ignition system 119 is off at least 10 to 12 hours. The sensor offset determination module 206 may determine that the vehicle is parked at work when the ignition system 119 is off for approximately 7 to 9 hours. The sensor offset determination module 206 may determine that the vehicle is parked at a place other than work or home when the ignition system 119 is off for less than 2 hours.

The sensor offset determination module 206 may determine whether the vehicle has made a roundtrip based on a comparison of distances traveled during multiple ignition-on cycles. Each ignition-on cycle may start when the ignition system 119 is switched from off to on and may end when the ignition system 119 is switched from on to off. The sensor offset determination module 206 may determine that the vehicle has made a roundtrip when the distances traveled during two consecutive ignition-on cycles are equal to each other or within a predetermined distance of each other. The sensor offset determination module 206 may determine the distance traveled during each ignition-on cycle based on the wheel speed from the WSS 194.

The sensor offset determination module 206 may use a mid-to-long term method to account for a sensor offset due to vehicle aging and drift in the output of the VLA sensor 196 over the life of the vehicle. In one such method, a road grade histogram module 210 creates and maintains a histogram 302 of road grade estimates (FIG. 3A). An x-axis 304 of the histogram 302 represents road grade in percent and a y-axis 306 of the histogram 302 represents distance traveled in meters. Although the x-axis 304 is shown having a range from −2% to 2%, the x-axis 304 may have a greater range, for example, from −50% to 50%. The road grade estimates may be grouped into bins having smaller sizes around 0% grade and larger sizes at steeper grades. For example, the road grade estimates may be grouped into bins such as [−50% −20% −15% −10% −7% −5% −4% −3% −2% −1% −0.75% −0.5% −0.25% 0% 0.25% 0.5% 0.75% 1% 2% 3% 4% 5% 7% 10% 15% 20% 50%]

The y-axis 306 represents the distance traveled corresponding to each bin of road grade estimates or percentage of total time traveled for each road grade estimate. The y-axis 306 is disposed at a 0% road grade. If the sensor offset is equal to zero, the histogram 302 is symmetric about an approximately 0% road grade. In other words, the sum of all of the bins of the histogram 302 is equal to approximately 0%. The sum of all of the bins may not be exactly equal to 0% due to error in this method.

The sensor offset determination module 206 may adjust the sensor offset based on an amount by which the sum of all of the bins is outside of a predetermined range. The sensor offset determination module 206 may adjust the sensor offset at predetermined intervals of distance traveled (e.g., every 1,000 miles). Once the sensor offset is adjusted, the sensor offset determination module 206 may clear all of the data in the histogram 302 and start creating a new histogram of road grade estimates.

The predetermined range may be a range that is centered about a 0% road grade (e.g., +/−0.278%). The predetermined range may correspond to a worst case error in this method. The worst case error may correspond to driving the vehicle 12,000 miles per year from a lowest possible ground elevation (e.g., −282 feet) to a highest possible ground elevation (e.g., 14,440 feet).

Figure 3B:
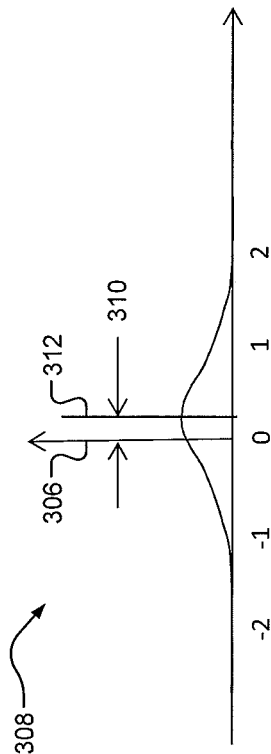
FIGS. 3A and 3B are graphs illustrating an example method of determining an offset in an output of a vehicle longitudinal acceleration sensor according to the principles of the present disclosure.
Figure 3A:
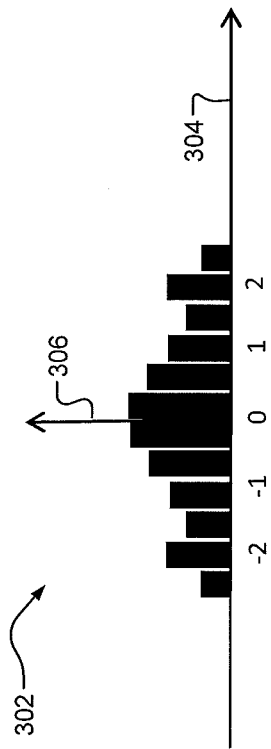

In various implementations, the data in a histogram of road grade estimates may be represented in the form of a bell curve 308 (FIG. 3B). The bell curve 308 is plotted with respect to the x-axis 304 and the y-axis 306. As with the histogram 302, the bell curve 308 is symmetric about an approximately 0% road grade when the sensor offset is zero. Thus, a difference 310 between a symmetry line 312 of the bell curve 308 and the y-axis 306 approximately represents the sensor offset.

In another mid-to-long term method, an elevation summation module 212 determines changes in the elevation of the vehicle based on the estimated road grade and determines a running sum of the elevation changes. The elevation summation module 212 may determine the elevation changes at predetermined intervals of distance traveled (e.g., every 1 meter). The elevation summation module 212 may determine the sum of the elevation changes using a relationship such as $$\Sigma E_i = \Sigma E_{i-1} + d_i * \sin(\alpha_i) \quad (5)$$

where $\Sigma E_i$ is a sum of the elevation changes at a present iteration i, $\Sigma E_{i-1}$ is the sum of the elevation changes at a previous iteration i−1, $d_i$ is a distance traveled corresponding to the present iteration i, and $\alpha_i$ is the estimated road grade for the present iteration i.

The sensor offset determination module 206 may adjust the sensor offset based on an amount by which the sum of the elevation changes is outside of a predetermined range. The sensor offset determination module 206 may adjust the sensor offset at predetermined intervals of distance traveled (e.g., every 1,000 miles). After adjusting the sensor offset, the sensor offset determination module 206 may reset the sum of the elevation changes to zero and determine a new running sum of the elevation changes.

The predetermined range may be centered about a zero. The predetermined range may correspond to a worst case error in this method. The worst case error may correspond to driving the vehicle 12,000 miles per year from a lowest possible ground elevation (e.g., −282 feet) to a highest possible ground elevation (e.g., 14,440 feet).

The elevation of the vehicle may change significantly when the vehicle is transported from an assembly plant to a dealership. Since vehicles are not typically driven from an assembly plant to a dealership, the sensor offset determined based on the running sum of the elevation changes may not be accurate after the vehicle is transported from the assembly plant to the dealership. Therefore, the running sum of the elevation changes may be initialized (e.g., set to zero) at the dealership using an external module (e.g., a scan tool). Alternatively, the elevation summation module 212 may initialize the running sum of the elevation changes when the vehicle elevation estimated based on the ambient air pressure indicates a change in vehicle elevation unrelated to driving the vehicle.

The elevation summation module 212 may also determine changes in the elevation of the vehicle based on the ambient air pressure from the AAP sensor 191 and determines a running sum of the elevation changes. For example, the elevation summation module 212 may estimate the vehicle elevation based on the ambient air pressure and determine the elevation changes based on the estimated vehicle elevation. The elevation summation module 212 may determine the elevation changes based on the estimated vehicle elevation at the same time that the elevation summation module 212 determines the elevation changes based on the estimated road grade.

The sensor offset determination module 206 may compare the sum of the elevation changes determined based on the estimated vehicle elevation to the sum of the elevation changes determined based on the estimated road grade. The sensor offset determination module 206 may adjust the sensor offset based on the sum of the elevation changes determined based on the estimated road grade when the difference between these two sums is within a predetermined range of zero. Otherwise, the sensor offset determination module 206 may not adjust the sensor offset based on the sum of the elevation changes determined based on the estimated road grade.

The elevation summation module 212 may also compare the running sum of the elevation changes to a lowest possible ground elevation (e.g., −282 feet) and a highest possible ground elevation (e.g., 14,440 feet). The elevation summation module 212 may adjust the running sum of the elevation changes when the running sum is less than the lowest possible ground elevation or greater than the highest possible ground elevation. For example, if the running sum of the elevation changes is less than the lowest possible ground elevation, the elevation summation module 212 may adjust the running sum to the lowest possible ground elevation. Conversely, if the running sum is greater than the highest possible ground elevation, the elevation summation module 212 may adjust the running sum to the highest possible ground elevation.

As discussed above, the sensor offset may be inaccurate when a vehicle is towed or otherwise moved from one location to another without switching the ignition system 119 from off to on. In addition, the method used to determine the sensor offset when the vehicle is first assembled may not be performed by vehicle service providers, such as dealerships, that do not have access to a surface with a predetermined grade. Thus, a different method may be used to determine the sensor offset in these cases.

Figure 4:
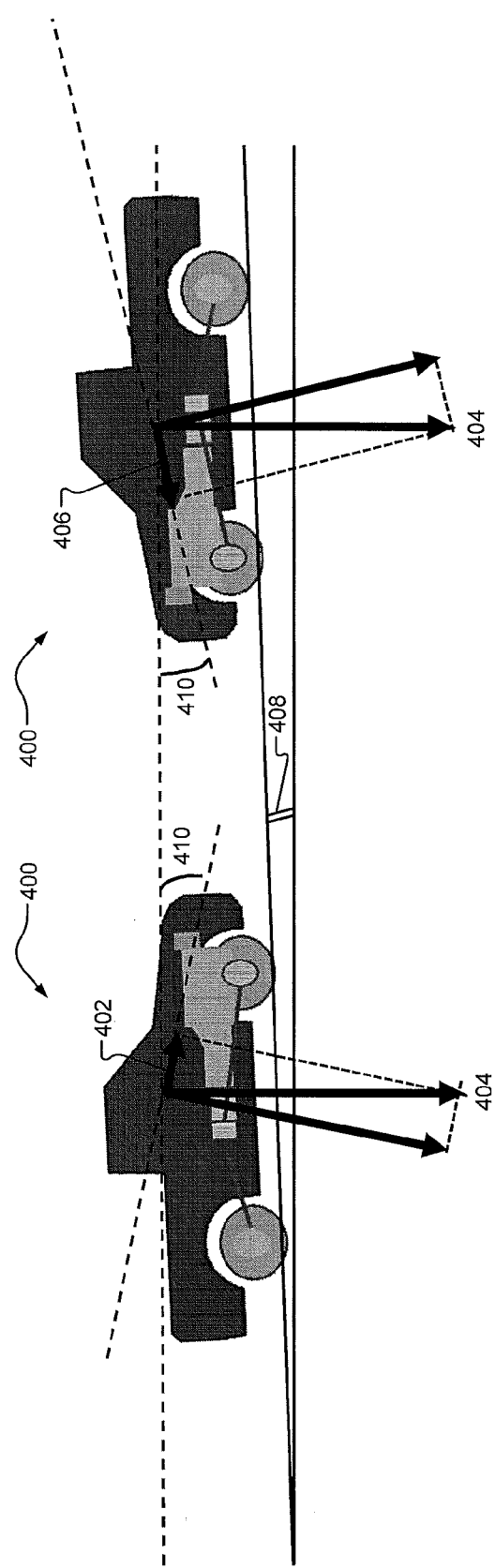
FIG. 4 is a functional block diagram illustrating an example method of determining an offset in an output of a vehicle longitudinal acceleration sensor according to the principles of the present disclosure.

In one such method, the road grade estimation module 204 estimates the road grade when a vehicle 400 (FIG. 4) is parked and heading in a first direction. In this condition, the VLA sensor 196 measures a first longitudinal acceleration 402 due to gravity force 404 acting on the vehicle. Then, the vehicle 400 is turned around by 180 degrees and parked at the same location such that the vehicle 400 is heading in a second direction that is opposite from the first direction. In this condition, the VLA sensor 196 measures a second longitudinal acceleration 406 due to the gravity force 404 acting on the vehicle 400. The road grade estimation module 204 again estimates the road grade while the vehicle 400 is parked, and the sensor offset determination module 206 determines the sensor offset based on the first estimated road grade and the second estimated road grade.

If the first and second estimated road grades have the same sign and about the same value, the sensor offset determination module 206 determines that the vehicle 400 is on a flat surface and sets the sensor offset equal to the value of the two estimated road grades. If the first and second estimated road grades have the same sign and different values, the sensor offset determination module 206 determines that a road surface angle 408 is less than a sensor pitch angle 410. In this case, the sensor offset determination module 206 sets the sign of the sensor offset equal to sign of the two estimated road grades and sets the magnitude of the sensor offset equal to the difference between the two estimated road grades divided by two.

If the first and second estimated road grades have different signs and different values, the sensor offset determination module 206 determines that the road surface angle 408 is greater than the sensor pitch angle 410. In this case, the sensor offset determination module 206 sets the sign of the sensor offset equal to sign of the greater of the two estimated road grades. In addition, the sensor offset determination module 206 sets the magnitude of the sensor offset equal to the difference between the two estimated road grades divided by two.

In another method that may be used by vehicle service providers to determine the sensor offset, all of the data in the histogram of road grade estimates is cleared while the vehicle is parked. The vehicle is then driven for any distance and returned to the same location and the same orientation. The sensor offset determination module 206 then sets the sensor offset equal to the difference 310 (FIG. 3B) between the symmetry line 312 of the histogram and the 0% grade corresponding to the y-axis 306.

A start-stop module 214 automatically stops and restarts the engine 102 when the engine 102 is idling. The start-stop module 214 may automatically stop the engine 102 when the vehicle speed is less than or equal to a predetermined speed (e.g., zero) and the driver depresses the brake pedal 174. The start-stop module 214 may automatically restart the engine 102 when the driver releases the brake pedal 174, when the driver depresses the accelerator pedal 104, and/or when the driver depresses a resume switch (not shown).

The start-stop module 214 may determine the vehicle speed based on the wheel speed from the WSS 194, for example, by setting the vehicle speed equal to the wheel speed. The start-stop module 214 may determine when the driver depresses or releases the accelerator pedal 104 based on the accelerator pedal position from the APP sensor 176. The start-stop module 214 may determine when the driver depresses or releases the brake pedal 174 based on an input received from the BPP sensor 178.

The start-stop module 214 may determine whether to automatically stop or restart the engine 102 based on the estimated rode grade. For example, the start-stop module 214 may automatically stop the engine 102 only when the engine 102 is idling and the estimated road grade is less than or equal to a predetermined grade, indicating that the vehicle is not on a steep hill. Thus, when the estimated road grade is greater than the predetermined grade, indicating that the vehicle is on a steep hill, the start-stop module 214 may not automatically stop the engine 102 when the engine 102 is idling.

The start-stop module 214 may automatically stop and restart the engine 102 by instructing a throttle control module 216, a fuel control module 218, and/or a spark control module 220 to stop or start the engine 102. The throttle control module 216 may control the throttle valve 112 by instructing the throttle actuator module 116 to achieve a desired throttle area. The fuel control module 218 may control the delivery of fuel to the cylinder 118 by instructing the fuel actuator module 124 to achieve a desired air/fuel ratio. The spark control module 220 may control the spark plug 128 by instructing the spark actuator module 126 to achieve desired spark timing.

The throttle control module 216 may stop or restart the engine 102 by instructing the throttle actuator module 116 to fully close or open the throttle valve 112. The fuel control module 218 may stop or start the engine 102 by instructing the fuel actuator module 124 to stop or start providing fuel to the cylinder 118. The spark control module 220 may stop or start the engine 102 by instructing the spark actuator module 126 to stop or start generating spark.

The TCM 198 may adjust a shift schedule of the transmission based on the estimated road grade. For example, the TCM 198 may normally shift the transmission based on a predetermined shift schedule. However, when the estimated road grade indicates that the vehicle is traveling up hill, the TCM 198 may delay shift points relative to the predetermined shift schedule in order to generate more torque. The engine 102 and the transmission may be referred to as actuators of the vehicle, and the start-stop module 214 and the TCM 198 may be referred to as actuator control modules.

Figure 5:
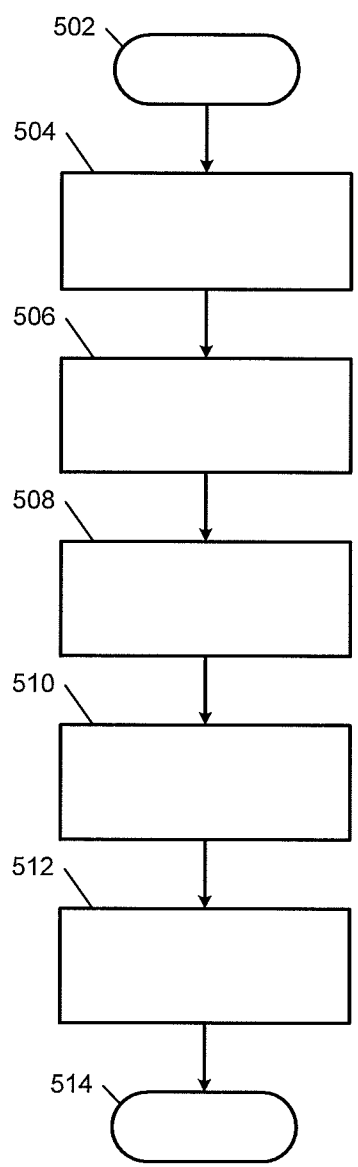
FIG. 5 is a flowchart illustrating an example method of estimating road grade based on an output of a vehicle longitudinal acceleration sensor according to the principles of the present disclosure.

Referring now to FIG. 5, a method for estimating the grade of a road on which a vehicle is traveling based on an output of a vehicle longitudinal acceleration (VLA) sensor begins at 502. At 504, the method measures the longitudinal acceleration of the vehicle using the VLA sensor. At 506, the method estimates the longitudinal acceleration of the vehicle based on an input from a transmission output speed sensor and/or a wheel speed sensor.

At 508, the method determines a longitudinal acceleration due to an offset in the output of the VLA sensor. At 510, the method determines a longitudinal acceleration due to the road grade based on the measured longitudinal acceleration, the estimated longitudinal acceleration, and the longitudinal acceleration due to the sensor offset. For example, the method may determine the longitudinal acceleration due to the road grade using relationship (3) as discussed above.

At 512, the method estimates the road grade based on the longitudinal acceleration due to the road grade. For example, the method may estimate the road grade using relationship (4) as discussed above. The method ends at 514.

Figure 6:
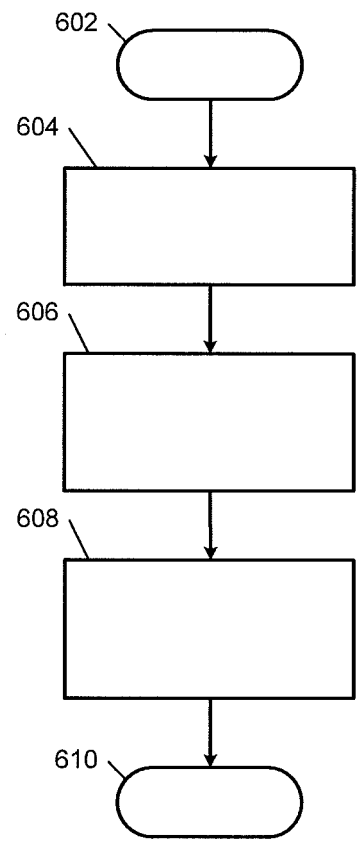
FIGS. 6 through 11 are flowcharts illustrating example methods of determining an offset in an output of a vehicle longitudinal acceleration sensor according to the principles of the present disclosure.

Referring now to FIG. 6, a method for determining an offset in the VLA sensor when a vehicle is first assembled begins at 602. At 604, the method parks the vehicle on a surface having a predetermined grade. At 606, the method provides the predetermined surface grade to a powertrain control system (PCS) using, for example, a user interface device (UID) (e.g., a touchscreen) in the vehicle or an external module (e.g., a scan tool).

At 608, the method determines the sensor offset based on an input from the VLA sensor and the predetermined grade. For example, the method may estimate a longitudinal acceleration based on the predetermined grade and set the sensor offset equal to the difference between a longitudinal acceleration measured by the VLA sensor and the estimated longitudinal acceleration. The method ends at 610. The method may permanently store the sensor offset in non-volatile memory and adjust the sensor offset over the life of the vehicle based on sensor offsets determined using other methods.

Figure 7:
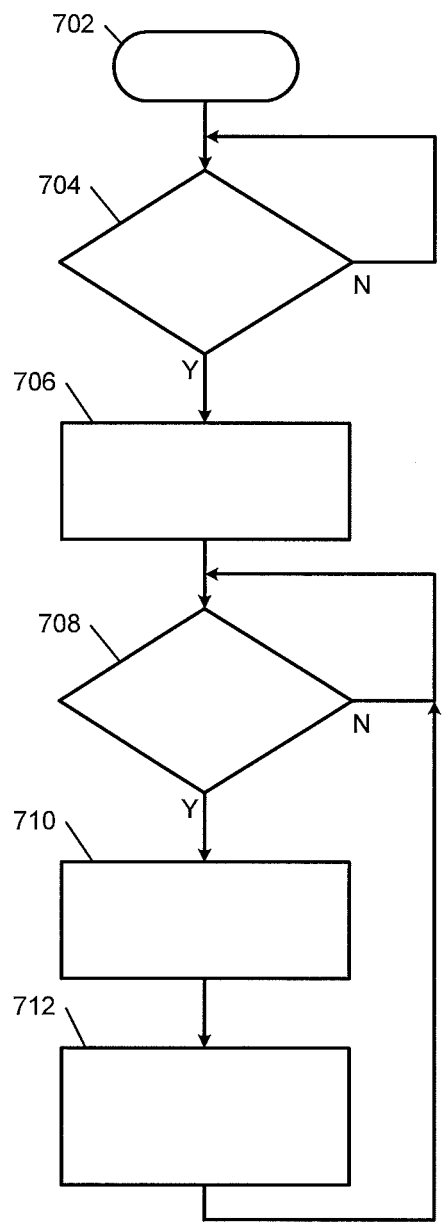

Referring now to FIG. 7, a method for determining the sensor offset at each ignition key off (e.g., each time that that a vehicle ignition is switched from on to off) begins at 702. At 704, the method determines whether an ignition key is switched from an on (or run) position to an off position. Alternatively, the method may determine whether a button is pressed to switch the vehicle ignition from on to off. If the ignition key is switched to the off position, the method continues at 706. Otherwise, the method continues to determine whether the ignition key is switched to the off position at 704.

At 706, the method stores the last reading from the VLA sensor before the ignition key off. At 708, the method determines whether the ignition key is switched from the off position to the on (or run) position. Alternatively, the method may determine whether a button is pressed to switch the vehicle ignition from off to on. If the ignition key is switched to the on position, the method continues at 710. Otherwise, the method continues to determine whether the ignition key is switched to the on position at 708.

At 710, the method obtains a new reading form the VLA sensor at the ignition key on (e.g., when the vehicle ignition is switched from off to on). At 712, the method determines the sensor offset based on the stored reading and the new reading. For example, the method may assume that the vehicle is at the same location for the ignition key off and the ignition key on, and set the sensor offset equal to the difference between the stored reading and the new reading.

Figure 8:
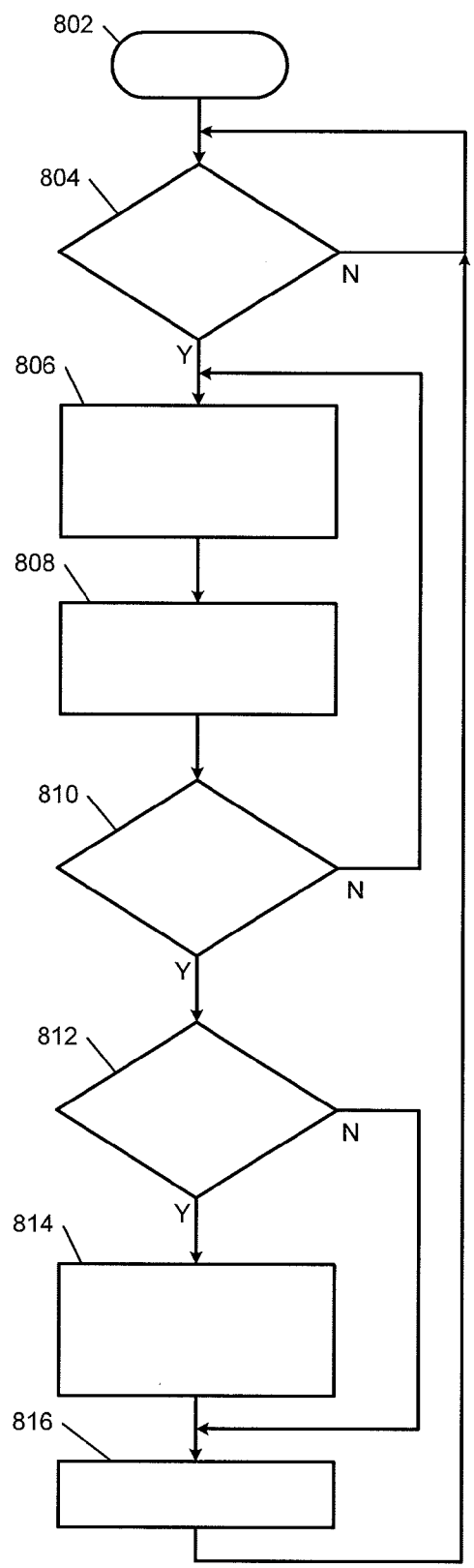

Referring now to FIG. 8, a method for determining the sensor offset over a relatively short trip (e.g., a 10 to 30 mile trip) begins at 802. At 804, the method determines whether the ignition key is switched from the off position to the on (or run) position. Alternatively, the method may determine whether a button is pressed to switch the vehicle ignition from off to on. If the ignition key is switched to the on (or run) position, the method continues at 806. Otherwise, the method continues to determine whether the ignition key is switched from to the on (or run) position at 804.

At 806, the method determines an average value of road grade estimates made over a predetermined distance (e.g., 1 meter). In other words, the method estimates the road grade multiple times over the predetermined distance, and then determines an average value of the road grade estimates made over the predetermined distance. At 808, the method determines a running sum of average values of road grade estimates, with each of the average values corresponding to the predetermined distance. In other words, the method adjusts the running sum at predetermined intervals of distance traveled that are each equal to the predetermined distance.

At 810, the method determines whether the ignition key is switched from the on (or run) position to the off position. Alternatively, the method may determine whether a button is pressed to switch the vehicle ignition from on to off. If the ignition key is switched to the off position, the method continues at 812. Otherwise, the method continues to determine whether the ignition key is switched from the on (or run) position to the off position at 810.

At 812, the method determines whether the sum of the average values corresponds to a roundtrip. The roundtrip may determine whether the sum corresponds to a roundtrip using the criteria set forth above with reference to the sensor offset determination module 206 of FIG. 2. If the sum corresponds to a roundtrip, the method continues at 814 and determines the sensor offset based on a difference between the sum and zero. The method then resets the sum to zero at 816. If the sum does not correspond to a roundtrip, the method continues at 816 and resets the sum to zero without determining the sensor offset based on the sum at 814.

Before determining whether the sum corresponds to a roundtrip, the method may determine whether the distance traveled since the sum was last reset is sufficient to make such a determination. For example, the distance traveled may be greater than or equal to the distance of a daily commute. If the distance traveled is sufficient, the method may proceed to determine whether the sum corresponds to a roundtrip. Otherwise, the method may continue to determine the sum of the average values.

Figure 9:
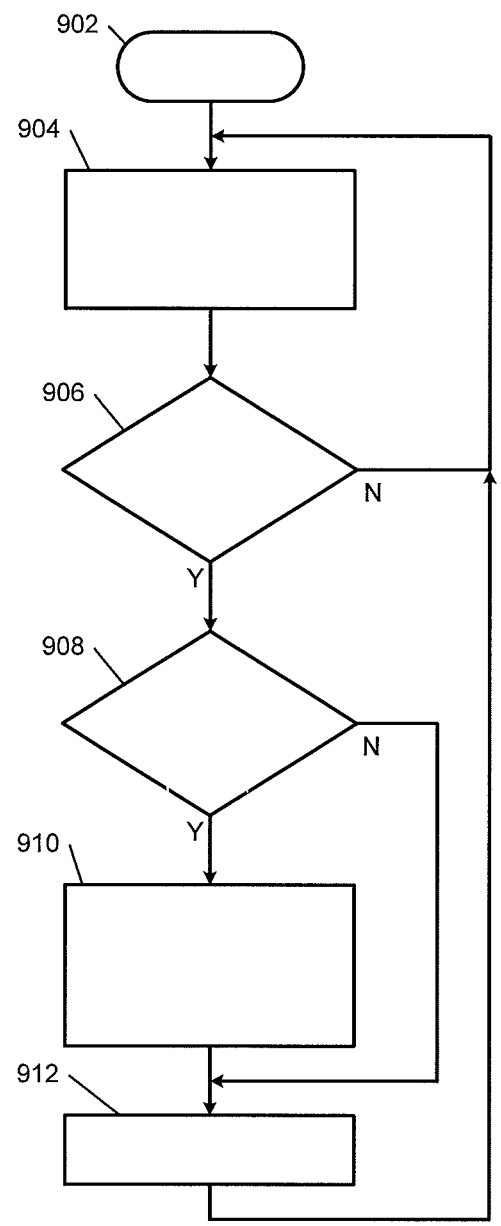

Referring now to FIG. 9, a first method for determining a sensor offset due to vehicle aging and drift in the output of the VLA sensor over the life of the vehicle begins at 902. At 904, the method creates and maintains a histogram of road grade estimates such as the histogram 302 of FIG. 3A. The road grade estimates may be grouped into bins having smaller sizes around 0% grade and larger sizes at steeper grades.

At 906, the method determines whether the distance traveled by the vehicle since the histogram was created (e.g., since the data in the histogram was last cleared) is greater than or equal to a predetermined distance (e.g., 1,000 miles). If the distance traveled is greater than or equal to the predetermined distance, the method continues at 908. Otherwise, the method continues to maintain the histogram at 904.

At 908, the method determines whether a sum of all of the bins is outside of a predetermined range. If the sum of all of the bins is outside of the predetermined range, the method continues at 910 and determines the sensor offset based on an amount by which the sum is outside of the predetermined range. The method then continues at 912 and clears all of the data in the histogram. If the sum of all of the bins is within the predetermined range, the method continues at 912 and clears all of the data in the histogram without determining the sensor offset based on the histogram.

The predetermined range may be a range that is centered about a 0% road grade (e.g., +/−0.278%). The predetermined range may correspond to a worst case error in this method. The worst case error may correspond to driving the vehicle 12,000 miles per year from a lowest possible ground elevation (e.g., −282 feet) to a highest possible ground elevation (e.g., 14,440 feet).

Figure 10:
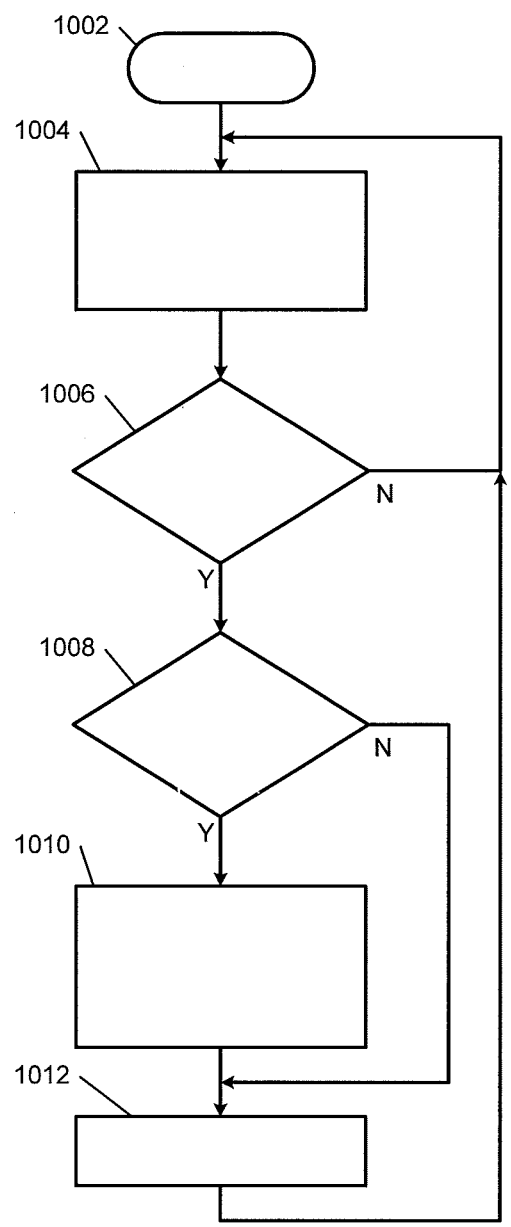

Referring now to FIG. 10, a second method for determining a sensor offset due to vehicle aging and drift in the output of the VLA sensor over the life of the vehicle begins at 1002. At 1004, the method determines a running sum of changes in an elevation of the vehicle based on the estimated road grade. The method may determine the sum of the elevation changes using relationship (5) as discussed above.

At 1006, the method determines whether the distance traveled by the vehicle since the sum was reset to zero is greater than or equal to a predetermined distance (e.g., 1,000 miles). If the distance traveled is greater than or equal to the predetermined distance, the method continues at 1008. Otherwise, the method continues to determine the sum of the elevation changes at 1004.

At 1008, the method determines whether the sum of the elevation changes is outside of a predetermined range. If the sum of the elevation changes is outside of the predetermined range, the method continues at 1010 and determines the sensor offset based on an amount by which the sum is outside of the predetermined range. The method then continues at 1012 and resets the sum to zero. If the sum of the elevation changes is within the predetermined range, the method continues at 1012 and resets the sum to zero without determining the sensor offset based on the sum.

The predetermined range may be a range that is centered about a 0% road grade (e.g., +/−0.278%). The predetermined range may correspond to a worst case error in this method. The worst case error may correspond to driving the vehicle 12,000 miles per year from a lowest possible ground elevation (e.g., −282 feet) to a highest possible ground elevation (e.g., 14,440 feet).

Figure 11:
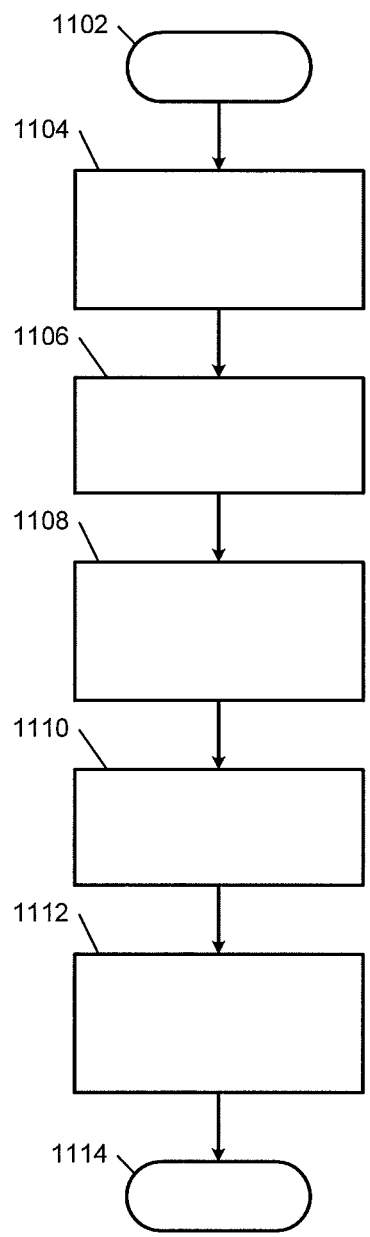

Referring now to FIG. 11, a method for determining the sensor offset when servicing the vehicle begins at 1102. At 1104, the method parks the vehicle at a location with the vehicle heading in a first direction. At 1106, the method obtains a first estimate of the road grade based on the output from the VLA sensor. At 1108, the method parks the vehicle at the same location with the vehicle heading in a second direction that is opposite from the first direction.

At 1110, the method obtains a second estimate of the road grade based on the output from the VLA sensor. At 1112, the method determines the sensor offset based on the first and second estimates. The method may determine the sensor offset based on the first and second estimates as discussed above with respect to the sensor offset determination module 206 of FIG. 2. The method ends at 1114.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a longitudinal acceleration estimation module that estimates a longitudinal acceleration of a vehicle based on at least one of a transmission output speed and a wheel speed;
    a vehicle longitudinal acceleration sensor that measures the longitudinal acceleration of the vehicle;
    a sensor offset determination module that determines an offset in the measured longitudinal acceleration;
    a road grade estimation module that estimates a grade of a road on which the vehicle is traveling based on the estimated longitudinal acceleration, the measured longitudinal acceleration, and the offset in the measured longitudinal acceleration; and
    an actuator control module that controls an actuator of the vehicle based on the estimated road grade.

2. The system of claim 1 wherein the road grade estimation module estimates the road grade based on a difference between the measured longitudinal acceleration and a sum of the estimated longitudinal acceleration and the offset.

3. The system of claim 1 wherein, when the vehicle is parked on a surface having a predetermined grade, the sensor offset determination module determines the offset based on the measured longitudinal acceleration and the predetermined grade.

4. The system of claim 1 wherein the sensor offset determination module:
    stores a first value of the longitudinal acceleration measured by the vehicle longitudinal acceleration sensor when an ignition system of the vehicle is switched from on to off;
    receives a second value of the longitudinal acceleration measured by the vehicle longitudinal acceleration sensor when the ignition system is switched from off to on; and
    determines the offset based on a difference between the first and second values.

5. The system of claim 1 further comprising a road grade summation module that determines a sum of average values of the estimated road grade over a predetermined distance, wherein the sensor offset determination module determines the offset based on a difference between the sum and zero when the sum corresponds to a roundtrip.

6. The system of claim 1 further comprising a road grade histogram module that maintains a histogram by grouping multiple values of the estimated road grade into bins, wherein the sensor offset determination module determines the offset based on an amount by which a sum of the bins is outside of a predetermined range.

7. The system of claim 1 further comprising an elevation summation module that:
    determines changes in an elevation of the vehicle at first predetermined intervals of distance traveled by the vehicle based on the measured longitudinal acceleration; and
    determines a sum of the elevation changes at second predetermined intervals of distance traveled by the vehicle, wherein the sensor offset determination module determines the offset based on an amount by which the sum of the elevation changes is outside of a predetermined range.

8. The system of claim 7 wherein the sensor offset determination module determines the offset further based on at least one of:
   a vehicle elevation estimated based on an ambient air pressure;
   a lowest possible ground elevation; and
   a highest possible ground elevation.

9. The system of claim 1 wherein the sensor offset determination module determines the offset based on a first road grade estimated when the vehicle is parked at a location while heading in a first direction and a second road grade estimated when the vehicle is parked at the same location and heading in a second direction that is opposite from the first direction.

10. A method comprising:
    estimating a longitudinal acceleration of a vehicle based on at least one of a transmission output speed and a wheel speed;
    measuring the longitudinal acceleration of the vehicle;
    determining an offset in the measured longitudinal acceleration; and
    estimating a grade of a road on which the vehicle is traveling based on the estimated longitudinal acceleration, the measured longitudinal acceleration, and the offset in the measured longitudinal acceleration; and
    controlling an actuator of the vehicle based on the estimated road grade.

11. The method of claim 10 further comprising estimating the road grade based on a difference between the measured longitudinal acceleration and a sum of the estimated longitudinal acceleration and the offset.

12. The method of claim 10 further comprising, when the vehicle is parked on a surface having a predetermined grade, determining the offset based on the measured longitudinal acceleration and the predetermined grade.

13. The method of claim 10 further comprising:
    storing a first value of the longitudinal acceleration measured when an ignition system of the vehicle is switched from on to off;
    receiving a second value of the longitudinal acceleration measured when the ignition system is switched from off to on; and
    determining the offset based on a difference between the first and second values.

14. The method of claim 10 further comprising:
    determining a sum of average values of the estimated road grade over a predetermined distance; and
    determining the offset based on a difference between the sum and zero when the sum corresponds to a roundtrip.

15. The method of claim 10 further comprising:
    maintaining a histogram by grouping multiple values of the estimated road grade into bins; and
    determining the offset based on an amount by which a sum of the bins is outside of a predetermined range.

16. The method of claim 10 further comprising:
    determining changes in an elevation of the vehicle at first predetermined intervals of distance traveled by the vehicle based on the measured longitudinal acceleration;
    determining a sum of the elevation changes at second predetermined intervals of distance traveled by the vehicle; and
    determining the offset based on an amount by which the sum of the elevation changes is outside of a predetermined range.

17. The method of claim 16 further comprising determining the offset further based on at least one of:
    a vehicle elevation estimated based on an ambient air pressure;
    a lowest possible ground elevation; and
    a highest possible ground elevation.

18. The method of claim 10 further comprising determining the offset based on a first road grade estimated when the vehicle is parked at a location while heading in a first direction and a second road grade estimated when the vehicle is parked at the same location and heading in a second direction that is opposite from the first direction.

* * * * *